United States Patent
Fender et al.

(10) Patent No.: US 12,001,414 B2
(45) Date of Patent: *Jun. 4, 2024

(54) ROWID DECODING: AN ALTERNATIVE TO DICTIONARY DECODING

(71) Applicant: Oracle International Corporation, Redwood Shores, CA (US)

(72) Inventors: Pit Fender, Union City, CA (US); Benjamin Schlegel, Merced, CA (US); Matthias Brantner, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,117

(22) Filed: Jun. 2, 2022

(65) Prior Publication Data
US 2022/0292066 A1 Sep. 15, 2022

Related U.S. Application Data (63) Continuation of application No. 16/697,431, filed on Nov. 27, 2019, now Pat. No. 11,392,566.

(51) Int. Cl.
*G06F 16/22* (2019.01)
*G06F 16/242* (2019.01)
*G06F 16/2455* (2019.01)
*G06F 40/242* (2020.01)

(52) U.S. Cl.
CPC .......... *G06F 16/221* (2019.01); *G06F 16/242* (2019.01); *G06F 16/24553* (2019.01); *G06F 40/242* (2020.01)

(58) Field of Classification Search
CPC .................................................. G06F 16/221
USPC ........................................................ 707/718
See application file for complete search history.

(56) References Cited

U.S. PATENT DOCUMENTS

| | | | |
|---|---|---|---|
| 2017/0255674 A1* | 9/2017 | Attaluri | G06F 16/248 |
| 2017/0255675 A1* | 9/2017 | Chavan | G06F 16/24562 |
| 2018/0089261 A1* | 3/2018 | Li | G06F 16/2453 |
| 2019/0155930 A1 | 5/2019 | Fender | |
| 2021/0157779 A1 | 5/2021 | Fender | |

OTHER PUBLICATIONS

Fender, U.S. Appl. No. 16/697,431, filed Nov. 27, 2019, Office Action, dated May 13, 2021.
Fender, U.S. Appl. No. 16/697,431, filed Nov. 27, 2019, Final Office Action, dated Jul. 26, 2021.
Fender, U.S. Appl. No. 16/697,431, filed Nov. 27, 2019, Notice of Allowance and Fees Due, dated Mar. 2, 2022.
Fender, U.S. Appl. No. 16/697,431, filed Nov. 27, 2019, Advisory Action, dated Oct. 18, 2021.
Westmann et al., "The implementation and performance of compressed databases". SIGMOD Rec., 29, dated 1998, 24 pages.

(Continued)

*Primary Examiner* — Syling Yen
(74) *Attorney, Agent, or Firm* — Hickman Becker Bingham Ledesma LLP (57) ABSTRACT

Techniques described herein propose a new RIDDecode operator in a QEP that uses ROWID lookup and fetch, instead of dictionary decoding, to retrieve decoded values, in order to reduce memory pressure and speed up processing.

8 Claims, 5 Drawing Sheets

(56) References Cited

OTHER PUBLICATIONS

Ray et al., "Database compression: A performance enhancement tool", In Proc. of 7th Intl. Conf. on Management of Data, COMAD, 1995, 20 pages.

Poess et al., "Data compression in oracle". In VLDB '2003: Proceedings of the 29th international conference on Very large data bases, pp. 937-947. VLDB Endowment, 2003, 11 pages.

Binnig et al., "Dictionary-based order preserving string compression for main memory column stores". In SIGMOD, dated 2009, pp. 283-296, New York, NY, USA.

Antoshenkov et al., "Order preserving compression". In ICDE '96: Proceedings of the Twelfth International Conference on Data Engineering, pp. 655-663, Washington, DC, USA, 1996.

Abadi et al., "Integrating compression and execution in column-oriented database systems", In SIGMOD, dated 2006, pp. 671-682, New York, NY, USA.

* cited by examiner

| ROWID | EMP_NO | FIRST_NAME | LAST_NAME | SALARY | DEPT_NO |
|---|---|---|---|---|---|
| XX1 | 1 | David | Smith | 5000 | 1 |
| XX2 | 2 | David | Miller | 7000 | 1 |
| XX3 | 3 | Marcel | Miller | 8000 | 2 |
| XX4 | 4 | Brian | Jones | 6500 | 3 |

Fig. 4 400

| LAST_NAME | AVG_SALARY |
|---|---|
| Smith | 5000 |
| Miller | 7500 |
| Jones | 6500 |

Fig. 5A 500

502 Generating a query execution plan (QEP) for a query, said QEP comprises a RIDDecode operator 504 Executing said RIDDecode operator while executing said QEP

Fig. 5B 550

552 Determining that each column of a set of columns of said base table satisfies particular criteria 554 Substituting said set of columns with a rowid pseudo column associated with said base table

Fig. 6

ROWID DECODING: AN ALTERNATIVE TO DICTIONARY DECODING

RELATED APPLICATION

The present application is a continuation of U.S. patent application Ser. No. 16/697,431, entitled Rowid Decoding: An Alternative to Dictionary Decoding, filed by Pit Fender, et al. on Nov. 27, 2019, the entire contents of which are incorporated herein by reference.

FIELD OF THE INVENTION

The present disclosure relates to the field of database systems, and in particular to ROWID decoding as an alternative to dictionary decoding during execution of query execution plan.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern database implementations, like the Oracle RDBMS, SAP Hanna, SQL Server or DBS, utilize a column store implementation for maximizing performance when running analytical workloads. Column stores are also the predominate storage layout used in database accelerators or offload engines. One key difference between column stores and row stores is that column stores hold the data in encoded and compressed form. For example, one common strategy to store variable length character data is to store it in dictionary encoded form. Another strategy is to convert variable length numbers, like Oracle Numbers, as fix width DSB (decimal scaled binary) numbers. While processing encoded data may speed up processing, there are cost penalties when the data is decoded for predicate or expression evaluation or when a result is returned to a client.

Described herein are techniques that use ROWID-based lookup and fetch, instead of dictionary decoding, to retrieve decoded values.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Dictionary Encoding and Decoding Overview

The idea of dictionary encoding and dictionary decoding is the idea of representing data from a different domain, most commonly variable length string data, into the domain of integer numbers. This approach, also known as attribute-level global dictionary compression, minimizes redundancy by compressing an often sparse domain into a dense domain that can be more efficiently stored and processed. Attribute-level global dictionary compression is commonly used in column stores and database management systems that run on special purpose hardware that provide hardware acceleration for data movement and partitioning operations.

Another example of variable length data is Oracle Numbers. An Oracle Number can be 1 to 22 Bytes long. In the context of column stores, it is beneficial to convert Oracle Numbers into DSB (decimal scaled binary) numbers that can be 1, 2, 4, 8 or 16 Bytes long, which leads to a more compact representation. However, an additional, even more important benefit is that the numbers of one column chunk can be converted into the same DSB width such that the column has a uniform memory layout. This benefit is paramount when running on special purpose hardware that provides hardware acceleration for data movement and partitioning operations.

A workload may include processing mainly of numbers and variable length character types. Hence, decoding previously encoded data is necessary for applying predicates and for building the final result set.

There are different strategies for implementing dictionary decoding.

One strategy for implementing dictionary decoding relies on lookup arrays by using one level of indirection. In particular, a key is used as an index into a lookup array. The lookup array stores an offset into a character field (variable length array) that contains the string. The length can be determined by the index to the beginning of the next entry. The next entry can be easily computed by looking up the next key, which corresponds to incrementing the previous key by one.

The counterpart to dictionary decoding is dictionary encoding, which relies on different data structures. Dictionary encoding may be implemented by lookups into a hash table or a trie. The most common case is to map a variable length string into an integer number, which is referred to as a key. When a hash table is used, the lookup is implemented by computing the hash value of the string and using the hash value to access the bucket of the hash table. When a trie is used, the string is used directly in order to lookup the key value.

The data structures of both categories need to be maintained, which entails incorporating updates, deletes and inserts. The difficulty of maintaining the structures increases in a distributed system. One of two techniques may be chosen: (1) holding the data structures in sync between the different instances of the system, or (2) applying partitioning or fragmentation of the dictionary data.

The decoding process and encoding process are hard-coded into two operators: one operator for the decoding process and another operator for the encoding process. However, the implementation choice is usually not sensible to the number of distinct values in comparison to the total number of values that the column stores. In other words, there are no different implementations for the encode process or decode process to choose from. Hence, an optimizer has no degree of freedom for planning those operators.

An alternative strategy for implementing dictionary decoding is a relational approach. In this approach, a dictionary is stored as a table. For encoding, several encoding patterns are available. An encode pattern can be expressed as a sequence of SQL and DML statements. The decision for choosing the appropriate encode pattern is cost based. Decoding happens through a join of an intermediate result (e.g., the one where encoded columns need to be decoded) and the dictionary table. The join predicate is an equal comparison on the dictionary keys.

This second strategy is more flexible than the first strategy. It is cost based and utilizes existing relational operators.

Table 1 shows an example SQL query between Employer and Department.

TABLE 1

```
CREATE TABLE EMP (
    EMP_NO NUMBER,
    FIRST_NAME VARCHAR(256),
    LAST_NAME VARCHAR(256),
    SALARY NUMBER,
    DEPT_NO NUMBER
);
CREATE TABLE DEP (
    DEP_NO NUMBER,
    DEP_NAME VARCHAR(256),
    MAN_FIRST_NAME VARCHAR(256),
    MAN_LAST_NAME VARCHAR(256)
);
SELECT FIRST_NAME, LAST_NAME, SALARY, DEP_NAME, MAN_LAST_NAME
FROM EMP E INNER JOIN DEP D ON E.DEPT_NO = D.DEP_NO
WHERE SALARY > 100000
```

Assume the encoding for the EMP and DEP tables are as follows:
DSB4: EMP_NO, SALARY, DEPT_NO
Dictionary Encoded: FIRST_NAME, LAST_NAME, DEP_NAME, MAN_FIRST_NAME, MAN_LAST_NAME Based on these assumptions, it can be observed that the join predicate and the filter predicate are applied on encoded numbers. It can also be observed that the elements of the select clause need to be decoded. In this example, there four (4) columns, namely the FIRST_NAME column, the LAST_ NAME column, the DEP_NAME column, and MAN_LAST_NAME column, that need to be dictionary decoded, and one (1) column, namely the SALARY column, that needs to be DSB decoded since the variable length number format is expected.

Figure 1:
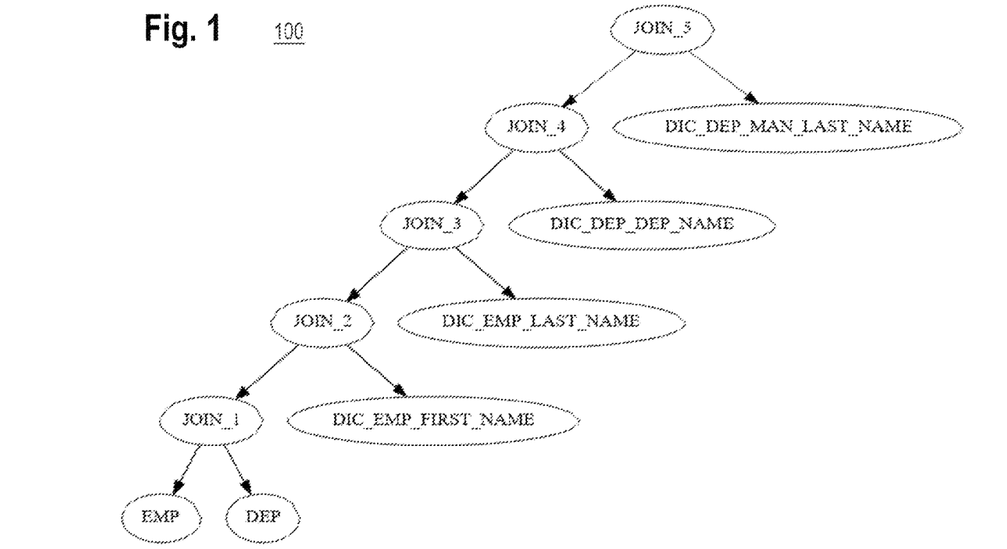
FIG. 1 illustrates a query execution plan incorporating dictionary decoding operations.

FIG. 1 illustrates a query execution plan (QEP) incorporating the dictionary decoding operations for the query shown in Table 1. While operating on encoded data can speed up processing, the data needs to be decoded when returning the query result or applying certain predicates. For each dictionary encoded column to decode, one dictionary join operation is added to the QEP. For example, one dictionary join operation is added for FIRST_NAME, one dictionary join operation is added for LAST_NAME, one dictionary join operation is added for DEP_NAME, and one dictionary join operation is added for MAN_LAST_NAME.

Query Optimization Overview

In query optimization, a query rewrite technique may rewrite a representation of a query from one form to another form as long as the two forms are semantically equivalent to each other. The representation of the query may be the query expression or code itself or may be an internally and/or externally recognized representation of the query, such as a query execution tree or other data structure. If the representation does not include the query expression itself, the representation may include data that describes processes that may be performed to execute the query, such as a query execution plan (QEP). A QEP is a set of directives and metadata that is prepared for an execution engine.

As used herein, a query representation is "rewritten" when the representation represents a rewritten version of the query, after the query has been rewritten from a first version to a second version. A first version may be an original query or may be another version rewritten from the original query. Two query representations are semantically equivalent to each other when the two query representations, if executed, would produce equivalent result sets, even if the result sets are assembled in different manners by the two query representations.

Expression Tree

An expression tree is a tree having a height of a least one, where every node in the tree can be one of the following types:
  input columns: Input columns can either be base columns (e.g., if the expression tree is part of a table scan, or can point to columns that are attributes of intermediate relations. Input column nodes must be leaf nodes in an expression tree or root nodes, if there is just one node in the expression tree.
  operands: This node type is also known as expression-node. Expression-nodes can represent arithmetic operands or comparison operands. Expression-nodes are either root nodes or inner nodes in the expression tree.
  constants: This node type is also known as constant-node. Constant-nodes must be leaf nodes in an expression tree or root nodes, if there is just one node in the expression tree.

Each element of a projection list of an operator is an expression tree. A predicate is also an expression tree. An ORDER BY or GROUP BY column is also an expression tree.

Observations of Dictionary Decoding

As discussed above, the relational approach to dictionary decoding involves storing dictionaries as tables. Encode and decode operations are mapped to existing operators of the physical algebra.

Referring again to Table 1 and FIG. 1, the QEP shows how the query can be compiled when applying the relational approach for dictionary decoding. Before returning the result, four (4) columns need to be first dictionary decoded. There are two dictionary encoded columns in each of the EMP and DEP tables: FIRST_NAME and LAST_NAME stemming from EMP table, and DEP_NAME and MAN_LAST_NAME stemming from DEP table. Four (4) additional join operations (e.g., JOIN_2, JOIN_3, JOIN_4, JOIN_5), one per each dictionary encoded column to be decoded, are applied with the relational dictionary. The join predicate for the dictionary join is an equality comparison between a dictionary key and an encoded column. In other words, a decoded column is joined to the previous intermediate result that was input to the join.

There are several observations of dictionary decoding. First, at the time of applying a dictionary join, a corresponding dictionary key has not been altered (i.e., no data manipulation has been applied), which means it is still the original value as it was retrieved from a base table.

Second, an in-memory column store loads its base table data from a row store that is often purely disk based. A column store may be a hot store of an RDBMS, like in Oracle In-Memory Columnar, Microsoft Hekaton, SAP Hana, or an offload engine like Rapid, which means that the same base table exists in two versions: (1) a compressed version in column major form that is part of the column store and (2) its original version in uncompressed form that is part of the row store (often disk based).

Third, in order to dereference the original storage location of the row store, a ROWID can be decoded. A ROWID is a pseudo column that uniquely identifies a row in a database; it encodes a storage location of a row of a base table in the database. For example, a ROWID of a row may include data block address of a data block that stores the row and ordinal position among the rows in the data block. A pseudo column is column that may referenced in a database statement and treated by a DBMS as a defined column even though the column is not defined for the table by a database dictionary of the database. The DBMS generates a column value to return for the column as part of executing the database statement.

Riddecode Operator

A RIDDecode operator of the present invention exploits all three observations of dictionary decoding described above. Instead of using a dictionary key, an original row from a base table that is preserved in a row store (i.e., stored in un-encoded form in a row major format) may be looked up or referenced by propagating a ROWID through one or more operators of a QEP. In an embodiment, the ROWID is added as one form of pseudo column and is made as a payload column. Once the ROWID is propagated up to the RIDDecode, the RIDDecode then extracts the ROWID and decodes it in order to fetch the original row from the base table version that is stored in the row store. Decoding the ROWID corresponds to extracting a path to a storage location of the row.

When fetching multiple rows for a set of ROWIDs, each access will lead most likely to a random database page access. However, there are different optimizations that may be utilized when fetching multiple rows for a set of ROWIDs.

One optimization is pre-ordering the ROWIDs according to their database page ids, which has two effects. One effect is that multiple ROWIDs that point to the same database page are grouped together such that accesses to the same page happen in sequence. The page may be kept in a buffer pool to avoid repeatably lengthily retrievals from storage. Another effect is that database pages are not accessed at random anymore. In fact, in some cases, a sequential scan might be beneficial and/or page pre-fetching might become feasible.

Another optimization is bulk processing, which enables rowset processing. Call overheads can be avoided by working on chunks of data at the same time. Other optimizations are possible.

Rowid Propagation Through a Query Execution Plan

Assume that a RIDDecode operator for a given base table is already placed in an operator tree representation of a QEP, which means that a placement algorithm has already been run. An example placement algorithm is described below. At this point, two main things are to be determined to propagate a ROWID through one or more plan operators of the QEP.

Columns that can be decoded by the RIDDecode operator are first determined. In an embodiment, one RIDDecode operator can only decode columns that belong to the same base table. In an embodiment, a set of possible columns may be from a projection list of an operator that is input to the RIDDecode operator. The set of possible columns is intersected with the set of columns of a given base table to obtain an intersection set. The columns in the intersected set are those columns that are associated with the base table. The encoding of each column in the intersected set is analyzed to determine which columns are decodable by the RIDDecode operator. As discussed elsewhere, there may be other variable-length number encodings, such as a family of DSB encodings, besides dictionary encodings. Only those columns that can be decoded by fetching the data from the unencoded base table that is held by in the row store, qualify as being columns that can be decoded by a RIDDecode operator. The set of decodable columns is referred to as a decodable column set.

Columns, from the decodable column set, that are payload columns are then determined. Payload columns are columns that are not referenced in any expression (e.g., arithmetic expressions or predicates). The resulting set of columns is referred to as a RID encode column set.

Since all columns of the RID encode column set are payload columns, they can be removed them from projection lists of all operators that are either direct or indirect inputs to the RIDDecode operator. However, the ROWID pseudo column from the base table that the RIDDecode operator will be operating on will need to be added to all those projection lists where the columns of the RID encode column set were removed from. In other words, all columns of RID encode column set are substituted with the ROWID pseudo column.

Figure 2:
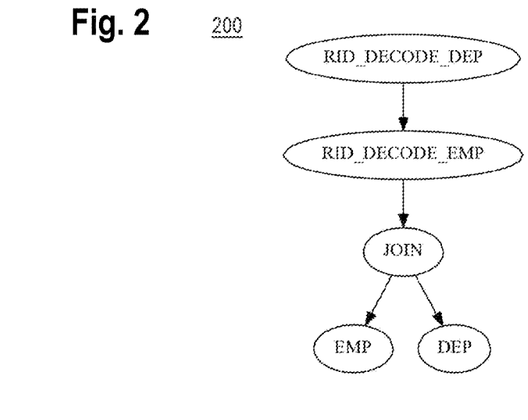
FIG. 2 illustrates a query execution plan incorporating ROWID decoding operations.

FIG. 2 illustrates a query execution plan (QEP) incorporating the ROWID decoding operations for the query shown in Table 1. The four (4) dictionary joins and the DSB decoding operation for the salary column are substituted with two (2) RIDDecode operators, one for each base table (e.g., RID_DECODE_DEP and RID_DECODE_EMP). The projection lists for each operator in the QEP are as follows:

Projection List of EMP table scan: ROWID, EMP_NO
Projection List of DEP table scan: ROWID, DEPT_NO
Projection List of the join: ROWID_EMP, ROWID_DEP
Projection List of RIDDecode for EMP columns:
ROWID_EMP, FIRST_NAME, LAST_NAME, SALARY
Projection List of RIDDecode for DEP columns:
FIRST_NAME, LAST_NAME, SALARY, DEP_NAME, MAN_LAST_NAME
  SPECIAL CASE: SQL QUERY WITH GROUP BY OPERATOR The above-described substitution approach works for all operators except for grouping operators (e.g., GROUP BY), and the semantics of the original query is retained. In other words, a ROWID cannot be added as a grouping column because it has different grouping characteristics than the columns it substitutes. For example, the number of distinct values that the combination of the substituted columns produces is different from the number of distinct values of the ROWID pseudo column. Specifically, the number of distinct values for the ROWID pseudo column is the number of rows of the base table, but the number of distinct values for the group of substituted columns is less.

In an embodiment, instead of making a ROWID pseudo column a grouping column, the ROWID pseudo column is added as an aggregation column. In general, an aggregation column is processed by an aggregate function. An example aggregate function is the MIN( ) aggregate function, returns the highest value (maximum) in a set of non-NULL values. Another example aggregate function is the MAX( ) aggregate function, which returns the lowest value (minimum) in a set of non-NULL values. In an embodiment, the MIN( ) aggregate function is used.

In addition to adding the ROWID pseudo column as an aggregate column, the original grouping columns, which include columns from a decodable column set, need to be preserved. To preserve the original grouping columns, the columns from the decodable column set are included in the projection lists of upstream operators that are either direct or indirect inputs to the GROUP BY operator. However, the columns can be finally substituted in the projection list of the GROUP BY operator with the ROWID pseudo column.

Table 2 shows an example SQL query based on the relational schema as shown in Table 1 with a GROUP BY operator.

TABLE 2

```
CREATE TABLE EMP (
    EMP_NO NUMBER,
    FIRST_NAME VARCHAR(256),
    LAST_NAME VARCHAR(256),
    SALARY NUMBER,
    DEPT_NO NUMBER
);
CREATE TABLE DEP (
    DEP_NO NUMBER,
    DEP_NAME VARCHAR(256),
    MAN_FIRST_NAME VARCHAR(256),
    MAN_LAST_NAME VARCHAR(256)
);
SELECT FIRST_NAME, AVG (E.SALARY) AS AVG_SALARY
FROM EMP
GROUP BY LAST_NAME
```

Figure 3:
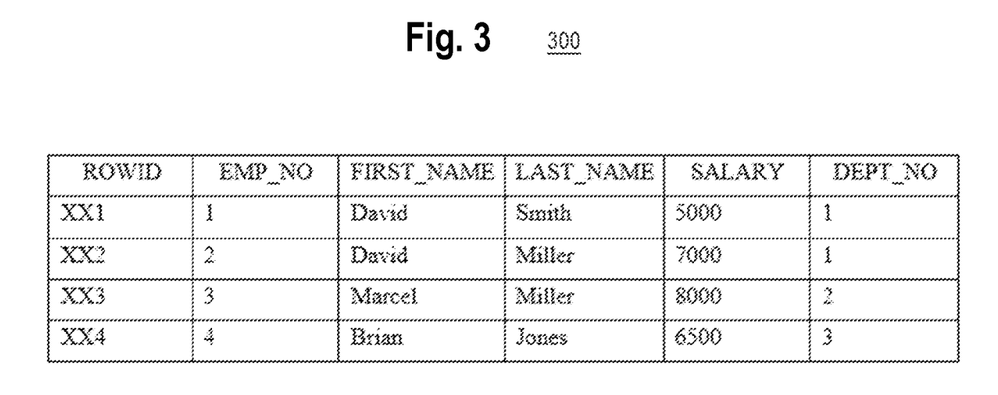
FIG. 3 illustrates an example employee table.
Figure 4:
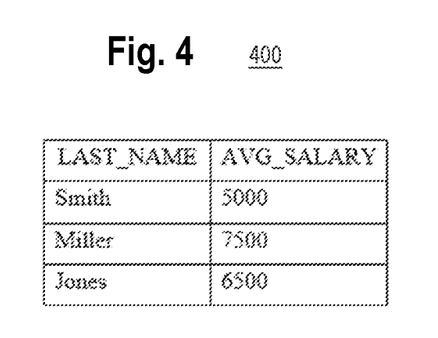
FIG. 4 illustrates example results of a query against employee table of FIG. 3.

The query determines the average salary per employee with the same last name. The RIDDecode operator for the EMP table would be placed as the last operator of a QEP corresponding to the query shown in Table 2. Since the grouping column LAST_NAME cannot be substituted before the GROUP BY is applied, it is included in the projection list of the table scan. Accordingly, this means:
  Projection List of EMP table scan: SALARY, LAST_NAME, ROWID
  Group By columns: LAST_NAME
  Aggregation columns: ROWID, SALARY→min (ROWID), avg(SALARY)
  Projection List of Group By operator: ROWID, AVG_SALARY
  Projection List of RIDDecode operator: AVG_SALARY, LAST_NAME FIG. 3 illustrates as example excerpt of the EMP table. FIG. 4 illustrates the result of the query of Table 2 run against the EMP table of FIG. 3. From FIG. 3 and FIG. 4, the minimum ROWID for the last name Miller is XX2 (e.g., out of XX2 and XX3). The second row of the table of FIG. 3 is retrieved using XX2 during the RIDDecode operation and is used to decode the name Miller from its dictionary value.

Compression

Most database management systems implement the notion of a ROWID or RID, with the format differing from vendor to vendor. However, the following components or aspects of a ROWID can be found in the same or a similar form:
  the data object number of the data object;
  the datafile in which the row resides;
  the data block in the datafile in which the row resides; and
  the position of the row in the data block.

For the Oracle Database, there are different ROWID formats. One ROWID format is stored as a 64-base String occupying 10 Bytes:
  bits 1 to 32 (bytes 1 to 4): data object number (0-4294967295);
  bits 33 to 44 (byte 5 and half byte 6): datafile number inside the tablespace (0-4095);
  bits 45 to 64 (half byte 6 and bytes 7 and 8): data block number inside the datafile (0-1048575); and
  bits 65 to 80 (bytes 9 and 10): row number inside the data block (0-65535).

This ROWID format may not be supported well by special hardware that provides hardware acceleration for data movement and partitioning operations. However, dictionary compression may be used to compress the ROWID pseudo column so that it fits into a machine word, based on an observation that the database object number and the datafile number rarely change for the different ROWID values of the same base table. This observation can be verified by making use of the DBMS ROWID built-in PL/SQL package with the SQL queries that are given in Table 3.

TABLE 3

```
select count (distinct dbms_rowid_object(rowid))
from <table_name>
select count (distinct dbms_rowid_relative_fno(rowid))
from <table_name>
```

The SQL queries in Table 3 count the number of distinct values for the object number and the datafile number for a given RDBMS table.

Furthermore, from the TPC-H Benchmark, which is published by the non-profit corporation TPC that is founded to define transaction procession and database benchmarks, it can be observed that only one data object number and only two different datafile numbers are used.

Based on these observations, in an embodiment, the combination of both values can be encoded and mapped to one dictionary value. For each base table, a dictionary that could be attached to the base tables metadata, is created. The compressed ROWID format would then substitute bits 1 to 44 with the dictionary value. In an embodiment, 16 bits are reserved for dictionary value, which would fit the compressed ROWID into 64 bits.

The compressed ROWID values are only stored in the column store as a separate column and, as such, will not be materialized in the row store. In the row store, the ROWID stays a pseudo column that can be inferred from the position of a row at the time the table is loaded into the in-memory column store.

Riddecode Placement

In the context of offload engines, placement of a RIDDecode operator may seem intuitive; that is, it may seem intuitive to place the RIDDecode directly above an offload operator that offloads a (sub) plan of the query to an offload engine, triggers execution and receives the results back. However, this may not necessarily be the most efficient query plan.

Before describing an algorithm for an optimal RIDDecode placement, there are two important observations. First, a RIDDecode can be deferred as long as no column value needs to be accessed (e.g., expression trees of size/height one). Second, a RIDDecode does not change the cardinality of a tuple stream.

An example RIDDecode placement algorithm includes the following steps. For each encoded column to decode from the same base table, all possible positions in a QEP where decoding could take place are identified at Step 1.

In an embodiment, an operator tree, which is a representation of the QEP, is traversed bottom-up starting from a leaf. The leaf corresponds to a base table access. For each operator tree node, it is determined whether the node operator corresponding to the current operator tree node that is traversed, has an expression tree of size larger than one, by referencing one of the columns belonging to the same base table as a corresponding ROWID pseudo column. If the node operator does not have an expression tree with a size larger than one, then the RIDDecode needs to take place after the operation represented by the current operator tree node. If the operator does have an expression tree with a size larger than one, then the column is referenced in the expression tree and the RIDDecode needs to take place before the current operator tree node. If the operator does have an expression tree with a size larger than one or the root has been reached, traversal of the operator tree is stopped, and Step 1 is repeated for the next encoded column to decode.

At Step 2, after all possible RIDDecode positions for all encoded column have been determined, those positions that are not feasible for all considered columns are determined by intersecting the sets of possible positions for all considered columns. Those positions that are determined as not feasible are eliminated. The positions in the intersection are those common for the encoded columns.

At Step 3, a RIDDecode is placed in the operator tree by determining, among all possible positions (that are feasible for all columns), where the cardinality of the intermediate result is the lowest, which leads to a global optimal decision that results in a plan with the lowest execution costs.

In an embodiment, the decision of where to place the RIDDecode does not influence the position of already placed RIDDecode operators (that will decode columns from different base tables) operations.

Query Optimizer Integration

There are several strategies for integrating the RIDDecode techniques into a cost-based optimizer.

One strategy introduces an alternative decoding strategy to the relational approach, where a dictionary join can be substituted by a RIDDecode operator. For example, the Transformation-Based Query Optimizers, like Columbia or Cascades, can be extended to annotate each transformation with the associated costs and choose the overall cheapest plan accordingly.

There are two strategies to apply the RIDDecode approach in a generative query optimizer. A first possibility is, as part of the Query Rewrite Phase I, the RIDDecode approach becomes a separate transformation that replaces the decoding operation, either in form of a dictionary join or by a RIDDecode operator. This approach is similar to the integration strategy in a transformation-based query optimizer.

A second possibility is to integrate the RIDDecode approach into Query Rewrite Phase II. That is, once a QEP is formed, existing decode operators or dictionary joins can be substituted by a RIDDecode operator. An example placement algorithm is described above.

Riddecode Integration Flow Example

Figure 5A:
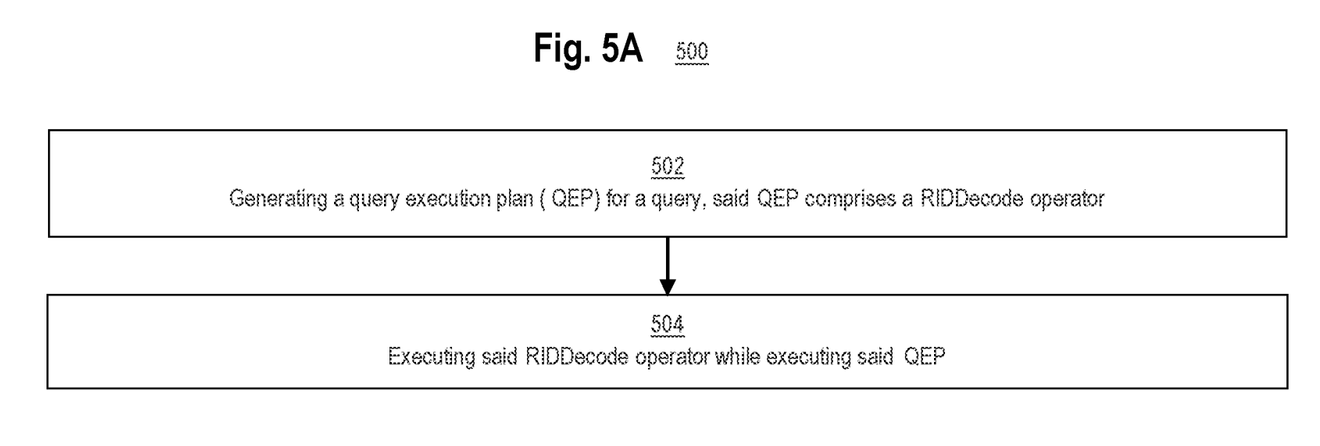
FIGS. 5A and 5B illustrate block diagrams depicting a RIDDecode technique according to an embodiment.
Figure 5B:
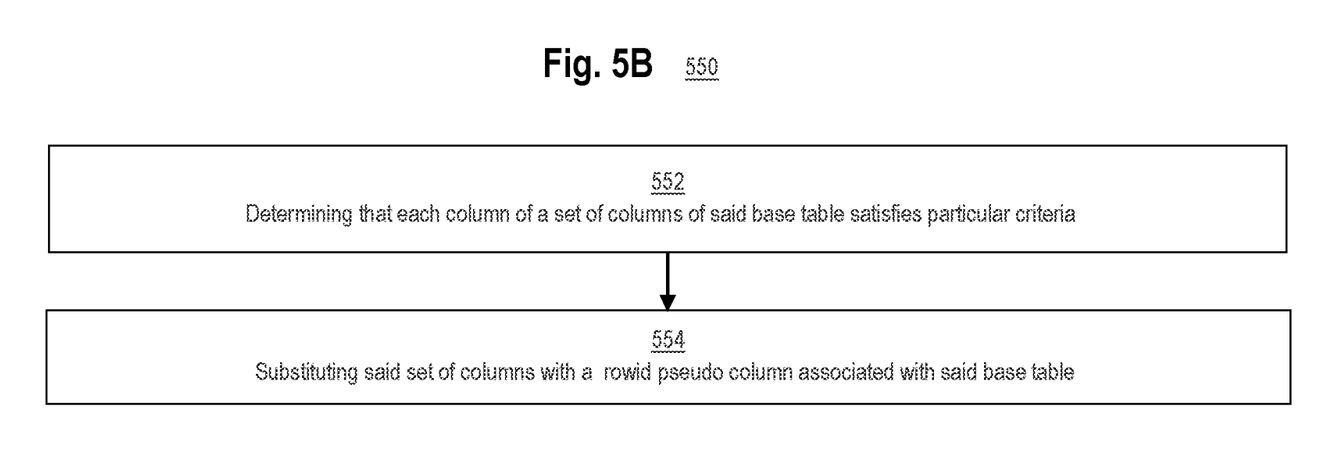

FIGS. 5A and 5B illustrate block diagrams depicting a RIDDecode technique according to an embodiment. At block 502, a query execution plan (QEP) is generated for a query that does not reference a GROUP BY operator. The QEP is generated by a query optimizer and represented by an operator tree comprising a hierarchy of plan operators.

In an embodiment, the QEP comprises at least a RIDDecode operator, a first plan operator that is lower than (e.g., downstream from) the RIDDecode operator in operator tree of the QEP and is an input to the RIDDecode operator, and a second plan operator that is lower than (e.g., downstream from) the first plan operator and generates rows from a base table.

In an embodiment, the RIDDecode operator may be placed in the QEP according to a predetermined heuristic that comprises identifying a plurality of positions to place the RIDDecode operator in the QEP and selecting a particular position from the plurality of positions based on execution cost. The positioning of the RIDDecode operator does not influence the positions of already or previously placed RIDDecode operators since they decode columns from different base tables.

In some embodiments, generating the QEP involves propagating a rowid pseudo column that is associated with the base table, through previous operators before the RIDDecode operator (e.g., all operators downstream from or below the RIDDecode operator in the operator tree of the QEP) such that, during execution of the QEP, the RIDDecode operator uses the rowid pseudo column to look up and fetch to retrieve decoded values. FIG. 5B illustrates example propagation of the rowid pseudo column.

At block 552, each column of a set of columns of the base table that satisfies particular criteria is determined. In an embodiment, the particular criteria include that each column of the set of columns is a payload column for the QEP. Each column of the set of columns is not referenced by an expression (e.g., arithmetic expression or predicate) in the query. The particular criteria also include that each column is dictionary encoded.

In an embodiment, the columns that satisfy the particular criteria are determined by identifying a set of columns in a projection list associated with the first plan operator, obtaining an intersected set of columns by intersecting the set of columns in the projection list with a set of columns of the base table, identifying those from the intersected set of columns that are dictionary encoded to obtain a decodable column set, and identifying those from the decodable column set that are payload columns.

At bock 554, the set of columns determined at block 552 is substituted with the rowid pseudo column that is associated with the base table. In an embodiment, the set of columns is removed from the first plan operator and the rowid pseudo column is added to the first plan operator. In an embodiment, the set of columns is removed from the projection list associated with the first plan operator and the rowid pseudo column is added to the projection list associated with the first plan operator.

In an embodiment, format of the rowid pseudo column is compressed and fits into a machine word. In an embodiment, the format of the rowid pseudo column includes a dictionary value that maps to a data object number and a data file number.

Returning to FIG. 5A, after the QEP is generated, at block 504, the RIDDecode operator is executed while executing the QEP. In an embodiment, executing the RIDDecode operator includes decoding the rowid pseudo column to extract a path to a storage location of a row of the base table, and using the path to obtain the row from the base table. The RIDDecode operator is associated with the base table and retrieves the set of columns determined from block 552 at the same time.

Advantages

By proposing RIDDecode as a new relational operator in a QEP, new features are introduced that allows for retrieval of, for a given ROWID, unencoded values of the corresponding base table. The novelty of this approach lies in the fact that RIDDecode allows for retrieval of several columns at the same time. Further, the memory consumption of that operator is rather low, since no in-memory data structures, like a hash table, are needed. Hence, an application of RIDDecode does not introduce additional memory pressure.

One or more RIDDecode operators are optimally placed in a QEP such that the execution overhead for the placement minimal. In an embodiment, intermediate result set sizes are considered; the lower the input set size (i.e., number of ROWIDs), the fewer retrievals need to be performed which, in turn, has a direct impact on the overall performance of the query. ROWIDs from base tables are propagated through all operators in the QEP, so that ROWIDs are available as input for respective RIDDecodes.

In an embodiment, ROWID pseudo columns may be compressed, using dictionary compression, to achieve a compression ratio of 1.25. In addition to a better compression ratio, the compressed ROWIDs fit into a machine word and, hence, allow for a faster processing.

Database Overview

Embodiments of the present invention are used in the context of database management systems (DBMSs). Therefore, a description of an example DBMS is provided.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary, also referred to herein as a data dictionary, comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

A tablespace is a database storage unit that groups related logical structures together, and contains one or more physical data files. These logical structures may include segments, or an allocation of space for a specific database object such as a table, a table cluster, or an index. A segment may be contained in one data file or may span across multiple data files. A segment may be defined using a set of extents, where an extent contains one or more contiguous database blocks.

A database block, also referred to as a data block, is a unit of persistent storage. A database block is used by a database server to store database records (e.g., to store rows of a table, to store column values of a column). When records are read from persistent storage, a database block containing the record is copied into a database block buffer in volatile memory of a database server. A database block usually contains multiple rows, and control and formatting information, (e.g., offsets to sequences of bytes representing rows or other data structures, list of transactions affecting a row).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

A data block may be associated with a data block address that uniquely identifies the data block and the data block's storage location within a storage device. A database server may request from a storage device a data block by data block address, or even by primary block address ranges of data blocks.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and push-down, common subexpression elimination, outer-to-inner join conversion, materialized view rewrite, and star transformation.

Hardware Overview

Figure 6:
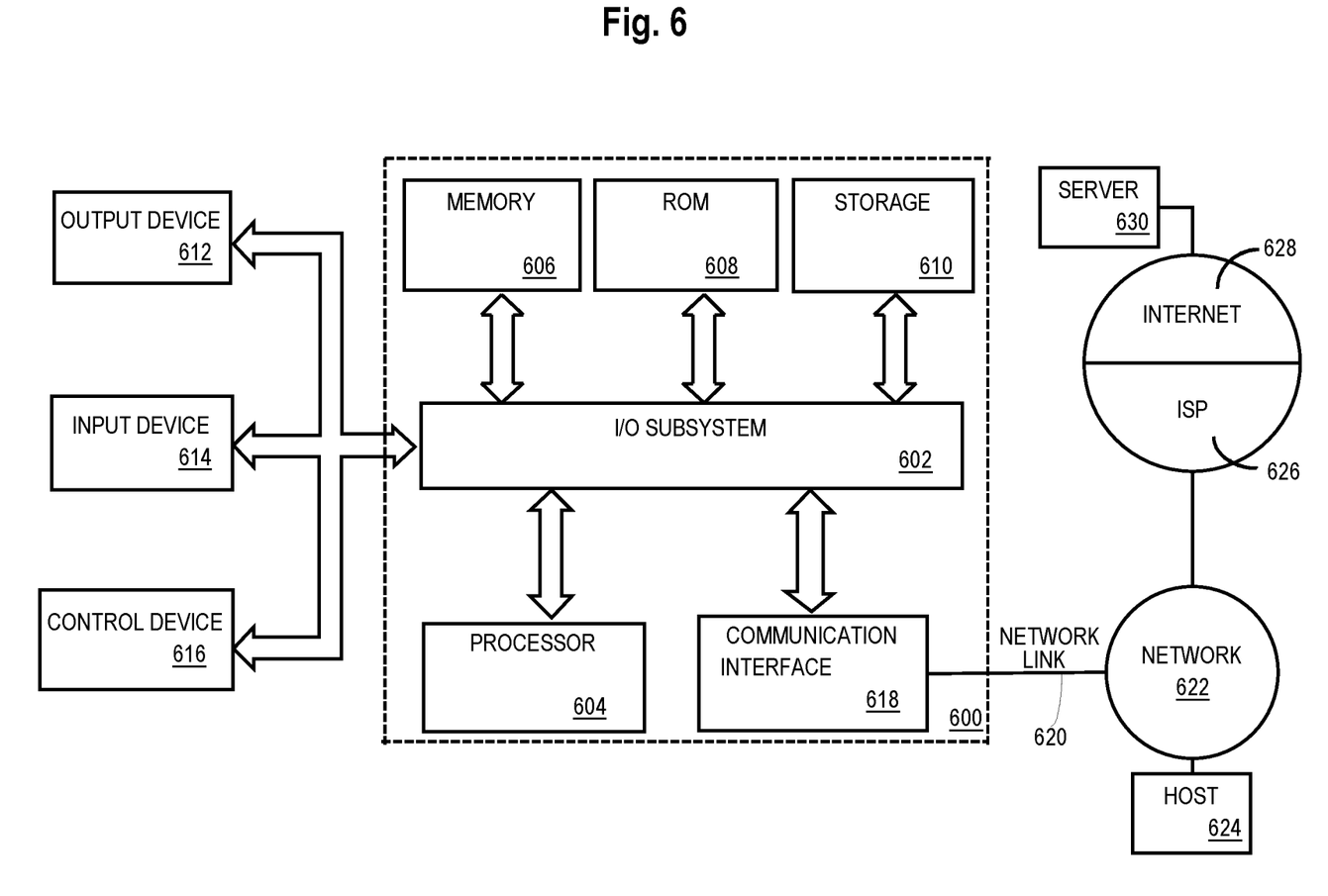
FIG. 6 illustrates a block diagram of a computing device in which the example embodiment(s) of the present invention may be embodiment.

Referring now to FIG. 6, it is a block diagram that illustrates a basic computing device 600 in which the example embodiment(s) of the present invention may be embodied. Computing device 600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 600 may include a bus 602 or other communication mechanism for addressing main memory 606 and for transferring data between and among the various components of device 600.

Computing device 600 may also include one or more hardware processors 604 coupled with bus 602 for processing information. A hardware processor 604 may be a general purpose microprocessor, a system on a chip (SoC), or other processor.

Main memory 606, such as a random access memory (RAM) or other dynamic storage device, also may be coupled to bus 602 for storing information and software instructions to be executed by processor(s) 604. Main memory 606 also may be used for storing temporary variables or other intermediate information during execution of software instructions to be executed by processor(s) 604.

Software instructions, when stored in storage media accessible to processor(s) 604, render computing device 600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 600 also may include read only memory (ROM) 608 or other static storage device coupled to bus 602 for storing static information and software instructions for processor(s) 604.

One or more mass storage devices 610 may be coupled to bus 602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 610 (e.g., the main hard disk for the device) stores a body of program and data for directing operation of the computing device, including an operating system, user application programs, driver and other support files, as well as other data files of all sorts.

Computing device 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch gesture (e.g., finger or stylus) input to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

While in some configurations, such as the configuration depicted in FIG. 6, one or more of display 612, input device 614, and cursor control 616 are external components (i.e., peripheral devices) of computing device 600, some or all of display 612, input device 614, and cursor control 616 are integrated as part of the form factor of computing device 600 in other configurations.

Functions of the disclosed systems, methods, and modules may be performed by computing device 600 in response to processor(s) 604 executing one or more programs of software instructions contained in main memory 606. Such software instructions may be read into main memory 606 from another storage medium, such as storage device(s) 610. Execution of the software instructions contained in main memory 606 cause processor(s) 604 to perform the functions of the example embodiment(s).

While functions and operations of the example embodiment(s) may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more software instructions to processor(s) 604 for execution. For example, the software instructions may initially be carried on a magnetic disk or solid-state drive of a remote computer. The remote computer can load the software instructions into its dynamic memory and send the software instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor(s) 604 retrieves and executes the software instructions. The software instructions received by main memory 606 may optionally be stored on storage device(s) 610 either before or after execution by processor(s) 604.

Computing device 600 also may include one or more communication interface(s) 618 coupled to bus 602. A communication interface 618 provides a two-way data communication coupling to a wired or wireless network link 620 that is connected to a local network 622 (e.g., Ethernet network, Wireless Local Area Network, cellular phone network, Bluetooth wireless network, or the like). Communication interface 618 sends and receives electrical, electromagnetic, or optical signals that carry digital data streams representing various types of information. For example, communication interface 618 may be a wired network interface card, a wireless network interface card with an integrated radio antenna, or a modem (e.g., ISDN, DSL, or cable modem).

Network link(s) 620 typically provide data communication through one or more networks to other data devices. For example, a network link 620 may provide a connection through a local network 622 to a host computer 624 or to data equipment operated by an Internet Service Provider (ISP) 626. ISP 626 in turn provides data communication services through the world wide packet data communication network now commonly referred to as the "Internet" 628. Local network(s) 622 and Internet 628 use electrical, electromagnetic or optical signals that carry digital data streams. The signals through the various networks and the signals on network link(s) 620 and through communication interface(s) 618, which carry the digital data to and from computing device 600, are example forms of transmission media.

Computing device 600 can send messages and receive data, including program code, through the network(s), network link(s) 620 and communication interface(s) 618. In the Internet example, a server 630 might transmit a requested code for an application program through Internet 628, ISP 626, local network(s) 622 and communication interface(s) 618.

The received code may be executed by processor 604 as it is received, and/or stored in storage device 610, or other non-volatile storage for later execution.

Software Overview

Figure 7:
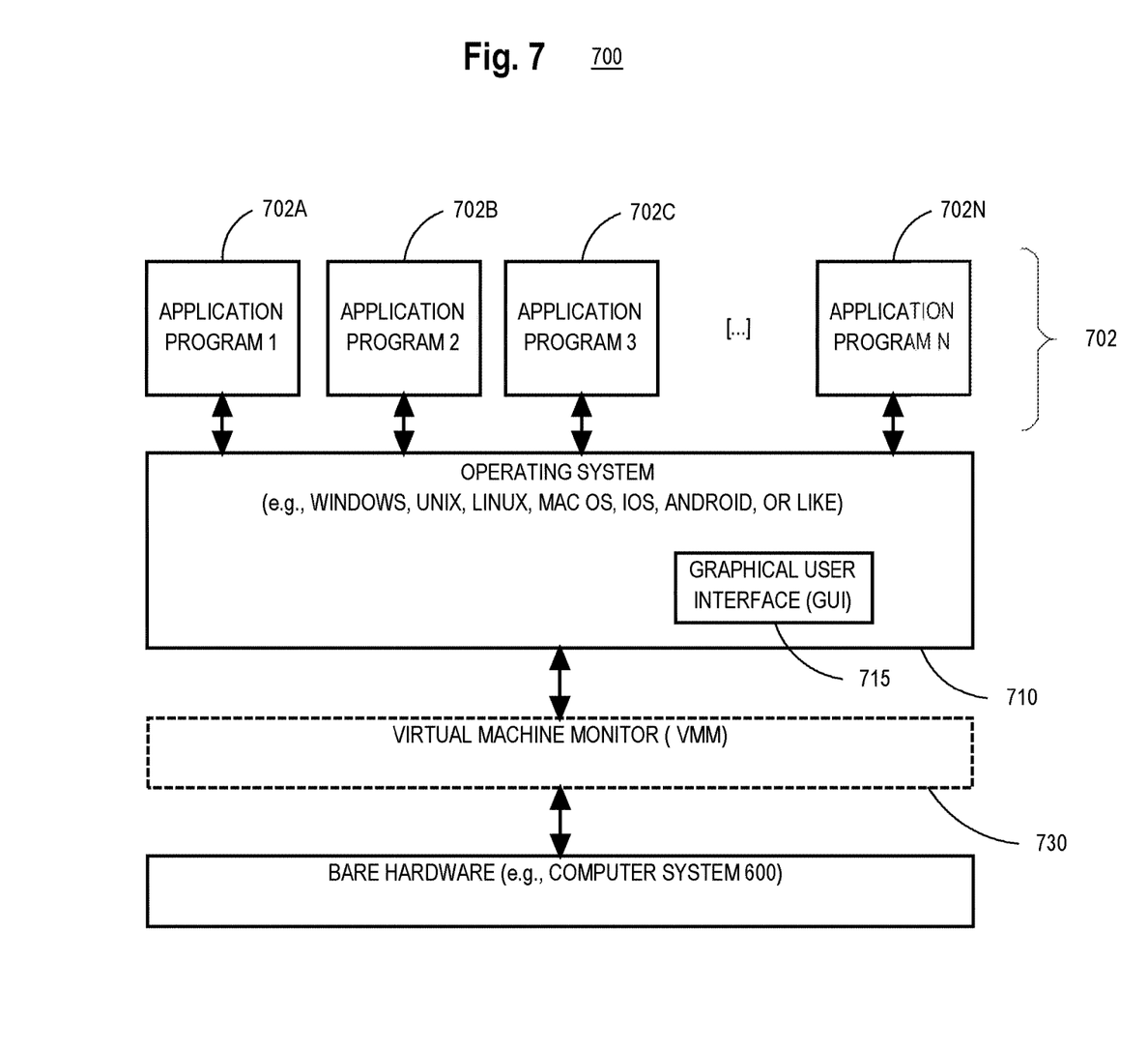
FIG. 7 illustrates a block diagram of a basic software system for controlling the operation of a computing device

FIG. 7 is a block diagram of a basic software system 700 that may be employed for controlling the operation of computing device 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of device 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the device 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of device 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
   generating a query execution plan (QEP) for a query that specifies to aggregate a particular column by at least one group column, wherein said QEP comprises:
     a first plan operator that generates rows from a base table and a rowid pseudo column, wherein said rowid pseudo column returns rowids that each encode a storage location of a respective row in a data block of a database;
     a group by plan operator that is higher than said first plan operator and that groups by at least one group column;
     an aggregate operator that applies an aggregate function to said rowid pseudo column, wherein said aggregate operator is higher than said group by plan operator;
     a RIDDecode operator that is higher than said aggregate operator, wherein said RIDDecode operator is configured to retrieve a value for said at least one group column using a rowid from said rowid pseudo column;
   wherein generating said QEP includes:
     including said rowid pseudo column, said at least one group column, and said particular column in a projection list for said first plan operator;
     substituting said at least one group column with said rowid pseudo column in a projection list for said group by operator;
   executing said RIDDecode operator while executing said QEP.

2. The method of claim 1, wherein each of said at least one group column is dictionary encoded.

3. The method of claim 1, wherein substituting said at least one group column with said rowid pseudo column comprises:
   removing said at least one group column from said group by plan operator;
   adding said rowid pseudo column to said group by plan operator.

4. The method of claim 1, wherein said aggregate function is a maximum function or a minimum function.

5. One or more non-transitory computer-readable storage medium storing instructions that, when executed by one or more processors, cause the one or more processors to perform functions comprising:
   generating a query execution plan (QEP) for a query that specifies to aggregate a particular column by at least one group column, wherein said QEP comprises:
      a first plan operator that generates rows from a base table and a rowid pseudo column, wherein said rowid pseudo column returns rowids that each encode a storage location of a respective row in a data block of a database;
      a group by plan operator that is higher than said first plan operator and that groups by at least one group column;
      an aggregate operator that applies an aggregate function to said rowid pseudo column, wherein said aggregate operator is higher than said group by plan operator;
      a RIDDecode operator that is higher than said aggregate operator, wherein said RIDDecode operator is configured to retrieve a value for said at least one group column using a rowid from said rowid pseudo column;
   wherein generating said QEP includes:
      including said rowid pseudo column, said at least one group column, and said particular column in a projection list for said first plan operator;
      substituting said at least one group column with said rowid pseudo column in a projection list for said group by operator;
   executing said RIDDecode operator while executing said QEP.

6. The one or more non-transitory computer-readable storage medium of claim 5, wherein each of said at least one group column is dictionary encoded.

7. The one or more non-transitory computer-readable storage medium of claim 5, wherein substituting said at least one group column with said rowid pseudo column comprises:
   removing said at least one group column from said group by plan operator;
   adding said rowid pseudo column to said group by plan operator.

8. The one or more non-transitory computer-readable storage medium of claim 5, wherein said aggregate function is a maximum function or a minimum function.

* * * * *